June 7, 1960 J. R. GREINER 2,939,627
BLOWER MOUNTING CONSTRUCTION
Filed Sept. 29, 1958 2 Sheets-Sheet 2
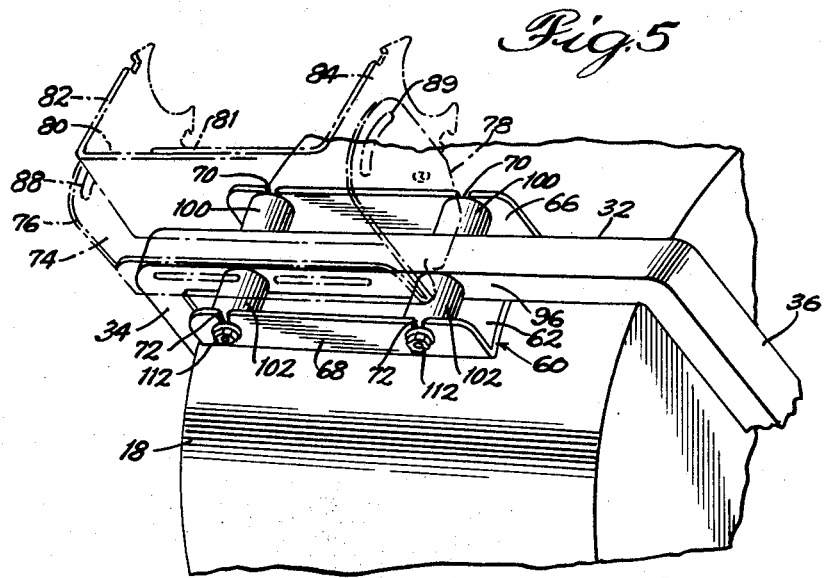
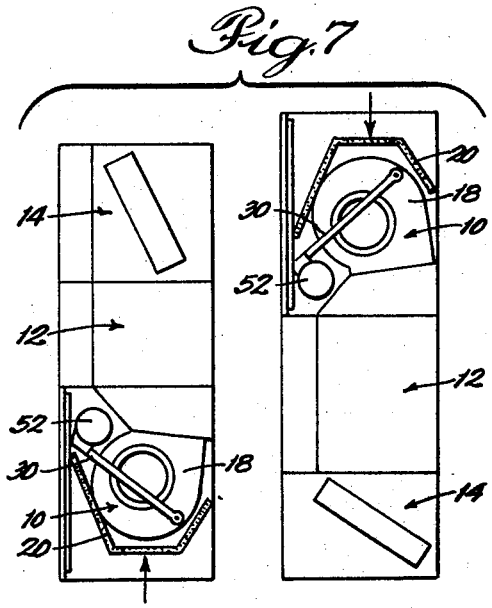
INVENTOR:
John R. Greiner

United States Patent Office 2,939,627
Patented June 7, 1960

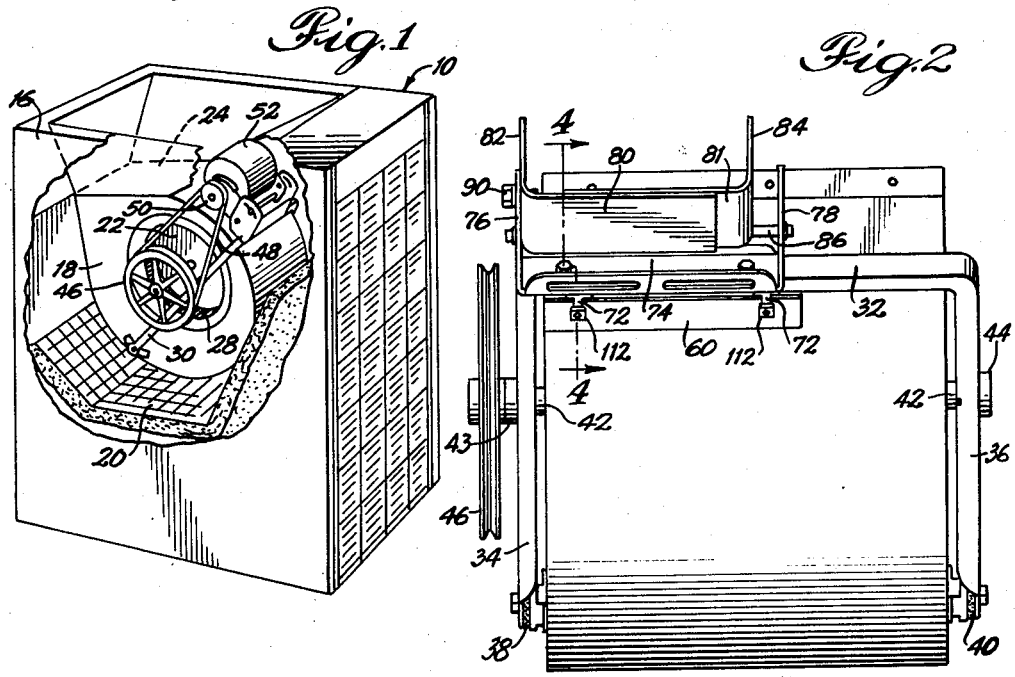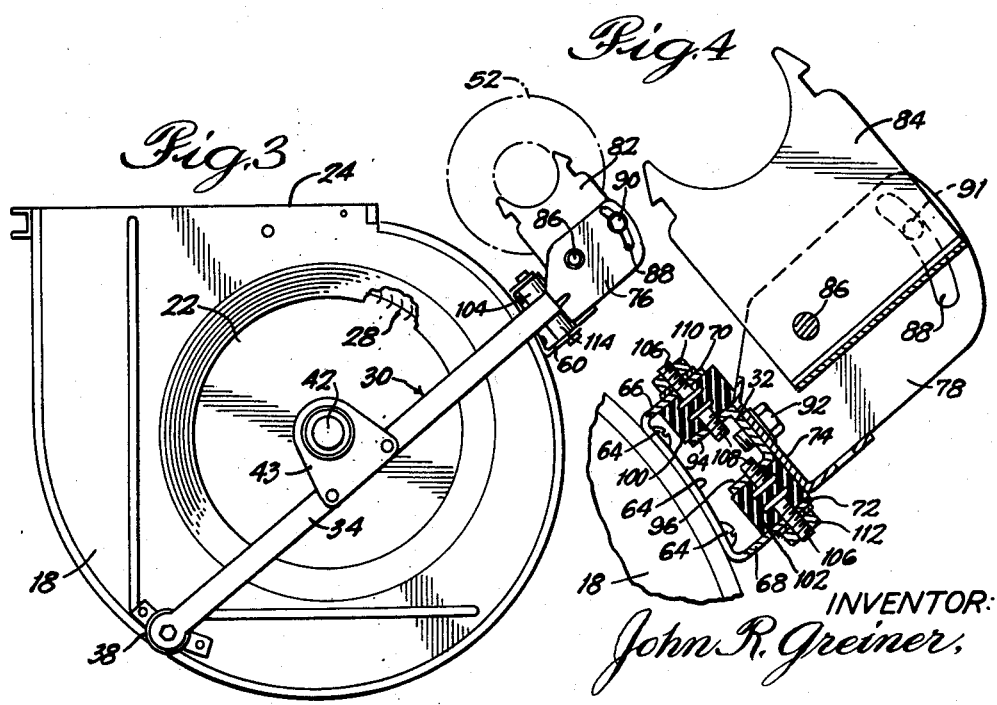

2,939,627

BLOWER MOUNTING CONSTRUCTION

John R. Greiner, Marshalltown, Iowa, assignor to Lennox Industries, Inc., a corporation of Iowa Filed Sept. 29, 1958, Ser. No. 764,041

8 Claims. (Cl. 230—117)

This invention relates generally to an interconnecting mounting structure for a blower fan and its motor drive, and more particularly to a novel resilient mounting support for interchangeable upwardly or downwardly directed blower orientation.

The present invention is particularly directed toward providing a novel resilient supporting structure for interconnecting the drive motor and blower fan of a blower unit so as to enable the entire blower unit to be mounted "rightside up" or "upside down" without requiring any structural changes or additions and without in any way affecting the efficiency or quiet operation of the blower unit. This structural adaptability for selectively reversible blower orientation is of particular importance in connection with stackable modular units for air heating, cooling and ventilating systems of the novel type disclosed and described in detail in the copending application of John W. Norris, Serial No. 755,785, filed August 18, 1958, having a common assignee with the present application. In such modular systems, the blower unit of a combination stack of units comprising separate blower, heater, and cooling coil units may be disposed either as the bottom or the top unit of a vertical stack of units. Where the blower unit comprises the bottom unit of a modular unit stack, the blower discharge outlet is oriented for flow directly upwardly, so that air will pass in a generally vertical straight-line path through a heating section and through a cooling section in a so-called "up-flow" all-season air treatment pattern. Where the blower unit comprises the top unit of such a modular unit stack, the same "up-flow" unit is reversed so that its blower discharge outlet is oriented for flow directly downwardly through the heating and cooling sections immediately therebelow, in a so-called "down-flow" pattern.

In order to provide a single modular blower unit completely adapted to either up-flow or down-flow air patterns, it is of critical importance to provide a mounting of the motor drive unit to the blower fan housing and drive shaft in a manner which is equally efficient and quiet for either "up" or "down" orientation of the entire unit. In order to avoid time-consuming and costly installation and servicing, it is also highly desirable that such interchangeable orientation be provided without any necessity for major adjustment or parts changes.

Accordingly, it is the primary object of this invention to provide a novel motor support structure for a blower construction, wherein an opposed pair of resilient cushion connectors effect vibration-isolated coupling of the motor to the blower housing.

It is another object of this invention to provide a resilient motor mounting means of the type herein described, wherein spaced cushion connectors are provided for interconnecting the motor structure to the blower structure, one cushion connector being in compression and the other being in tension for up-flow orientation of the blower, and the tension-compression relation of the cushion connectors being reversed for down-flow orientation of the blower.

It is a further object of this invention to provide a resilient motor mounting means of the type herein described, wherein spaced cushion connectors are provided for interconnecting the motor structure to the blower structure, the motor being supported upon the resilient mounting means for up-flow orientation of the blower and being suspended therefrom for down-flow orientation of the blower.

It is still another object of this invention to provide novel cushion connector means, for mechanically coupling a motor mounting structure to a blower fan housing, providing metal shanks extending axially from the ends of a resilient body member and fixedly embedded therein in spaced relation, and wherein the shanks are fixedly secured to the motor mounting structure and to the blower housing respectively for vibration-isolated interconnection thereof independently of the space orientation of the blower housing.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view, partly broken away to show details of internal construction, of a modular blower unit embodying the novel structure and features of the present invention;

Figure 2 is an end elevational view of the blower housing of Figure 1, showing the motor mounting structure of the present invention;

Figure 3 is a side elevational view of the structure shown in Figure 2;

Figure 4 is a fragmentary enlarged view, partly in cross section, of the motor mounting structure as shown in Figure 3;

Figure 5 is a perspective view of the cushion connector mounting structure as secured to the blower housing;

Figure 6 is a perspective view of a cushion connector; and

Figure 7 is a diagrammatic view of two alternative vertical stacking arrangements of separate modular units for all-season air conditioning, employing the blower unit of Figure 1 in both up-flow and down-flow arrangements.

Referring now more particularly to Figures 1 and 7 of the drawing, I have indicated generally at 10 a modular blower unit adapted to be stacked in vertical orientation with a cooperating heating unit 12 and a cooling unit 14. At the left-hand portion of Figure 7, the blower unit 10 is shown as the lowermost or base unit of the modular stack, whereas at the right-hand portion of Figure 7 the blower unit 10 has been shown as the uppermost unit of the stack. In this way, the unit 10 is intended to be interchangeably oriented for either up-flow or down-flow air direction.

The blower unit 10 comprises an external casing or cabinet of generally rectangular cross section within which a blower housing 18 is fixedly mounted. A hammock filter 20 arcuately surrounds a major portion of the blower housing 18 at its air inlet side, so that air admitted through the casing 16 will be appropriately filtered before entry into an inlet 22 of the blower housing 18. An outlet 24 serves to discharge the air supply to a heating and/or cooling unit of a modular unit stack, as indicated in Figure 7. A blower 28 of the well known "squirrel cage" type is mounted within the housing 18, as fragmentarily indicated in Figure 3.

A main frame channel 30 of generally U-shaped configuration, comprising a cross leg 32 and side legs 34 and 36, is provided for mounting attachment of a suitable motor drive to the blower housing. Reference may be made to my prior Patent No. 2,764,341 for a detailed disclosure of a similar main frame structure for a blower unit. The side legs 34 and 36 are secured at their free ends to the housing 18 by means of vibration-damping mounting assemblies 38 and 40 which include rubber grommet means. The side legs 34 and 36 are secured to a drive shaft 42 of the blower 28 by means of vibration-damping bearing assemblies 43 and 44. The structural details of the casing mounting assemblies 38 and 40, and the blower shaft bearing assemblies 43 and 44, will not be described in detail herein, and reference may be made to my said prior patent for a detailed disclosure of suitable vibration damping means.

A pulley 46 is secured to the blower shaft 42 at its one end, and is coupled by means of a drive belt 48 (see Figure 1) to a cooperating pulley 50 of the drive shaft of a motor or power unit 52. The novel and inventive features of the present invention are particularly directed to the structural means for supporting the motor 52 upon the main frame channel 30, and thereby connecting it to the blower housing 18 and the blower drive shaft 42. This structure and its advantages will now be set forth in detail.

Referring now more particularly to Figures 2, 4 and 5 of the drawing, a cushion connector bracket 60 provides an arcuate wall 62 formed to contactingly conform with and engage the curved outer surface of the blower housing 18, and is secured thereto by means of bolts or the like 64. Side flanges 66 and 68 extend upwardly from the arcuate wall 64, generally at right angles thereto, and are formed with pairs of slots 70 and 72 at opposite ends of the longitudinal edges thereof.

A motor mounting bracket 74, having side plate portions 76 and 78, serves to support a pair of mating and interconnected motor frame members 80 and 81. Side plates 82 and 84 of the motor frame members 80 and 81, having side plate portions 82 and 84, respectively, are adapted to be disposed within the side plates 76 and 78 of the bracket 74 and rotatably secured thereto by means of an elongated hinge rod 86. Arcuate slots 88 and 89 are formed in the side plates 76 and 78. Lock bolts 90 and 91 extend through the slots 88 and 89, respectively, and the corresponding side plates 82 and 84, for fixedly positioning the motor support frame members 80 and 81 in a rotated position of orientation, as desired.

The motor mounting bracket 74 thus serves to carry the full weight of the motor 52, and is in turn fixedly secured by means of suitable bolts 92 to the cross leg 32 of the main frame channel 30 (see Figure 4). The heart of the present invention relates to the manner in which the cross leg 32 is connected to the connector bracket 60 and thereby to the housing 18. In order to achieve a fully resiliently damped interconnection of the cross leg 32 with the blower housing 18, I provide a novel combination of cushion connector elements. The cross leg 32 is formed so as to provide side flanges 94 and 96. Double pairs of cushion connector elements 100 and 102 each provide a generally cylindrical rubber body portion 104, having longitudinally axially aligned pairs of threaded bolts 106 and 108 extending therefrom. The threaded bolts are headed for secure embedding in spaced apart relation within the cylindrical body 104 of each cushion connector, as seen in Figure 4 of the drawing, and the shank portions thereof project outwardly a substantial distance. In this way, the threaded bolts 106 and 108 of each cushion connector are resiliently isolated so as to avoid any direct transmission of vibrations therebetween and to eliminate all direct metal-to-metal contacts.

The shanks of the inner pairs of threaded bolts 108 of the opposed pair of cushion connectors 100 and 102 are directly threaded into the side flanges 94 and 96 of the main frame channel cross leg 32. The shanks of the opposite or outer threaded bolts 106 of the pairs of cushion connectors are received in the corresponding opposed pairs of slots 70 and 72 of the side flanges 66 and 68 of the cushion connector bracket 60. Suitable pairs of lock nuts 110 and 112 serve to fixedly secure the outwardly extending pairs of threaded bolts 106 to the bracket side flanges 66 and 68 within the slots 70 and 72 thereof. A ground wire 114 provides an electrostatic interconnection between the main frame channel 30 and the cushion connector bracket 60.

It will be apparent that when the blower housing 18 is oriented with its discharge outlet directed upwardly, the motor 52 and its supporting structure will exert its full weight upon the cushion connector bracket 60 and the housing 18 only through the pairs of cushion connectors 100 and 102. When thus oriented, the uppermost pair of cushion connectors 100 will be subjected to primarily tension forces, whereas the lower pair of cushion connectors 102 will be subjected to primarily compression forces. When the orientation of the blower housing 18 is reversed for downward air discharge, the entire motor structure will be resiliently "suspended" from the cushion connector bracket 60 and the blower housing 18, and the forces exerted upon the cushion connectors will also be reversed, so that the pair 100 will be in compression and the pair 102 will be in tension.

In this way, the entire weight of the motor is supported upon the blower housing 18 by means of the main frame channel 30, which is in turn resiliently connected to the blower housing 18 and the blower fan drive shaft 42 in a resiliently-damped manner. The casing mounting assemblies 38 and 40 and the pairs of cushion connectors 100 and 102 provide the resilient points of attachment of the motor supporting structure with the blower housing 18. The resiliently-damped bearing assemblies 43 and 44 provide the interconnection between the main frame channel 30 and the blower drive shaft 42.

Some changes may be made in the construction and arrangement of the parts of my device without departing from the real spirit and purpose of my invention, and it is my intention to cover by my claims any modified forms of structure or use of mechanical equivalents which may be reasonably included within their scope.

What is claimed is:

1. A blower construction comprising a housing having an air inlet and an air outlet, a fan drive shaft supported by said housing, a fan rotatably mounted within said housing upon said drive shaft, a frame providing a cross leg extending transversely across a portion of the blower housing, a motor supporting structure secured to said frame cross leg and adapted to fixedly carry a motor for driving connection with said fan drive shaft, and resilient connector means comprising a pair of resilient cushion members fixedly extending from opposite relative upper and lower edges of said frame cross leg and being fixedly secured to said housing, whereby said frame cross leg and the motor supporting structure are secured in vibration-damped relation to said housing independently of the orientation in space of the latter.

2. A blower construction comprising a housing having an air inlet and an air outlet, a fan drive shaft supported by said housing, a fan rotatably mounted within said housing upon said drive shaft, a frame providing a cross leg extending transversely across a portion of the blower housing, a motor supporting structure secured to said frame cross leg and adapted to fixedly carry a motor for driving connection with said fan drive shaft, and resilient connector means comprising a pair of resilient cushion members fixedly extending from opposite relative upper and lower edges of said frame cross leg and being fixedly secured to said housing, whereby the weight of the motor supporting structure effects compression of the cushion member extending from the lower edge of said frame cross leg to said housing and tension of the cushion member extending from the upper edge of said cross leg to said housing.

3. A blower construction comprising a housing having an air inlet and an air outlet, a fan drive shaft supported by said housing, a fan rotatably mounted within said housing upon said drive shaft, a frame providing a cross leg extending transversely across a portion of the blower housing, a motor supporting structure secured to said frame cross leg and adapted to fixedly carry a motor for driving connection with said fan drive shaft, and means securing said frame cross leg to said housing, said last means comprising a pair of resilient cushion connector members extending from opposite relative upper and lower edges of said frame cross leg, each of said cushion members having a pair of rigid coupling elements embedded therein in spaced relation and projecting therefrom, one of the coupling elements of each cushion member being rigidly secured to said frame cross leg and the other being rigidly secured to said housing.

4. A blower construction comprising a housing having an air inlet and an air outlet, a fan drive shaft supported by said housing, a fan rotatably mounted within said housing upon said drive shaft, a generally U-shaped rigid frame member providing a pair of side legs and a cross leg encompassing a portion of the blower housing, means securing the ends of said frame side legs to said housing, bearing means rotatably securing said frame side legs to said fan drive shaft, a motor supporting structure secured to said frame cross leg and adapted to fixedly carry a motor for driving conncetion with said fan drive shaft, and means securing said frame cross leg to said housing, said last means comprising a pair of resilient cushion connector members extending from opposite relative upper and lower edges of said frame cross leg, each of said cushion members having a pair of rigid coupling elements embedded therein in spaced relation and projecting therefrom, one of the coupling elements of each cushion member being rigidly secured to said frame cross leg and the other being rigidly secured to said housing.

5. A blower construction adapted for reversible up-flow and down-flow orientation comprising a housing having an air inlet and an air outlet, a fan drive shaft supported by said housing, a fan rotatably mounted within said housing upon said drive shaft, a frame providing a cross leg extending transversely across a portion of the blower housing, a motor supporting structure secured to said frame cross leg and adapted to fixedly carry a motor for driving connection with said fan drive shaft, and resilient connector means comprising a pair of resilient cushion connector members each having a pair of rigid coupling elements embedded therein in spaced relation and projecting therefrom, one of the coupling elements of one cushion member being rigidly secured to said frame cross leg at a relative upper edge thereof and the other being rigidly secured to said housing relatively above said cross leg, one of the coupling elements of the other cushion member being rigidly secured to said frame cross leg at a relative lower edge thereof and the other being rigidly secured to said housing relatively below said cross leg, whereby the weight of the motor supporting structure effects compression of the cushion member extending from the lower edge of said frame cross leg to said housing and tension of the cushion member extending from the upper edge of said cross leg to said housing, the relative position of said opposed cushion member being reversed for alternate up-flow and down-flow orientation of the blower construction.

6. A blower construction adapted for reversible up-flow and down-flow orientation comprising a housing having an air inlet and an air outlet, a fan drive shaft supported by said housing, a fan rotatably mounted within said housing upon said drive shaft, a frame providing a cross leg extending transversely across a portion of the blower housing, a motor supporting structure secured to said frame cross leg and adapted to fixedly carry a motor for driving connection with said fan drive shaft, and resilient connector means comprising opposed pairs of resilient cushion connector members each having a pair of rigid coupling elements embedded therein in spaced relation and projecting therefrom, a coupling element of each of one pair of cushion members being rigidly secured to said cross leg at a relative upper edge thereof and the other coupling element of each thereof being rigidly secured to said housing relatively above said cross leg, a coupling element of each of the other pair of cushion members being rigidly secured to said cross leg at a relative lower edge thereof and the other coupling element of each thereof being rigidly secured to said housing relatively below said cross leg, whereby the weight of the motor supporting structure effects compression of the pair of cushion members extending from the lower edge of said frame cross leg to said housing and tension of the pair of cushion members extending from the upper edge of said cross leg to said housing, the relative position of said pairs of cushion members being reversed for alternate up-flow and down-flow orientation of the blower construction.

7. A blower construction comprising a housing having an air inlet and an air outlet, a fan drive shaft extending generally horizontally across said housing, bearing means carried by said housing and supporting said drive shaft at its ends for rotation, a fan rotatably mounted within said housing upon said drive shaft, an external frame around said housing and providing a cross leg, extending transversely across a portion of the blower housing, a motor supporting structure secured to said frame cross leg and adapted to fixedly carry a motor for driving connection with said fan drive shaft, and resilient connector means comprising a pair of resilient cushion members fixedly extending from opposite relative upper and lower edges of said frame cross leg and being fixedly secured to said housing, whereby said frame cross leg and the motor supporting structure are secured in vibration-damped relation to said housing independently of the orientation in space of the latter.

8. A blower construction comprising a housing having an air inlet and an air outlet, fan means rotatably mounted within said housing, a frame providing a cross leg extending transversely across a portion of the blower housing, a motor supporting structure secured to said frame cross leg and adapted to fixedly carry a motor for driving connection with said fan means, and resilient connector means comprising a pair of resilient cushion members fixedly extending from opposite relative upper and lower edges of said frame cross leg and being fixedly secured to said housing, whereby said frame cross leg and the motor supporting structure are secured in vibration-damped relation to said housing independently of the orientation in space of the latter.

References Cited in the file of this patent
UNITED STATES PATENTS

| | | |
|---|---|---|
| 2,268,046 | Marker et al. | Dec. 30, 1941 |
| 2,764,341 | Greiner | Sept. 25, 1956 |